UNITED STATES PATENT OFFICE.

JOSHUA VALENTINE EVES AND PETER SHAW, OF BELFAST, IRELAND, ASSIGNORS TO J. AND T. M. GREEVES, LIMITED, OF BELFAST, IRELAND.

MACHINERY FOR HACKLING AND SPREADING FLAX AND OTHER LONG-STAPLE FIBERS.

1,099,084. Specification of Letters Patent. Patented June 2, 1914.

Application filed June 6, 1911. Serial No. 631,550.

*To all whom it may concern:*

Be it known that we, JOSHUA VALENTINE EVES and PETER SHAW, British subjects, residing both at Forth River Mills, Belfast, county Antrim, Ireland, have invented certain new and useful Improvements in Machinery for Hackling and Spreading Flax and other Long-Staple Fibers, of which the following is a specification.

This invention relates to mechanism of the class described in Eves' prior application Serial No. 518273 for the purpose of removing flax, or other pieces from the holders of a hackling machine fitted with an automatic screwing machine such as is described in Eves' Patent No. 662117, and Reade, Crawford and McKibbin's Patent No. 775352.

The object of this invention is to provide mechanism by which the stricks or pieces of flax may be removed from the holders of such machines and delivered to the next machine known as a spread board or gill frame.

It consists essentially in an automatic transfer or spreading apparatus constructed with one or more pairs of grippers to seize and draw the flax from the flax holders of the hackling machine nippers to transfer the flax to the table of the spread board, and mechanism for operating these simultaneously with the movements of the hackling machine.

The invention will be fully described with reference to the accompanying drawings.

Figure 1:
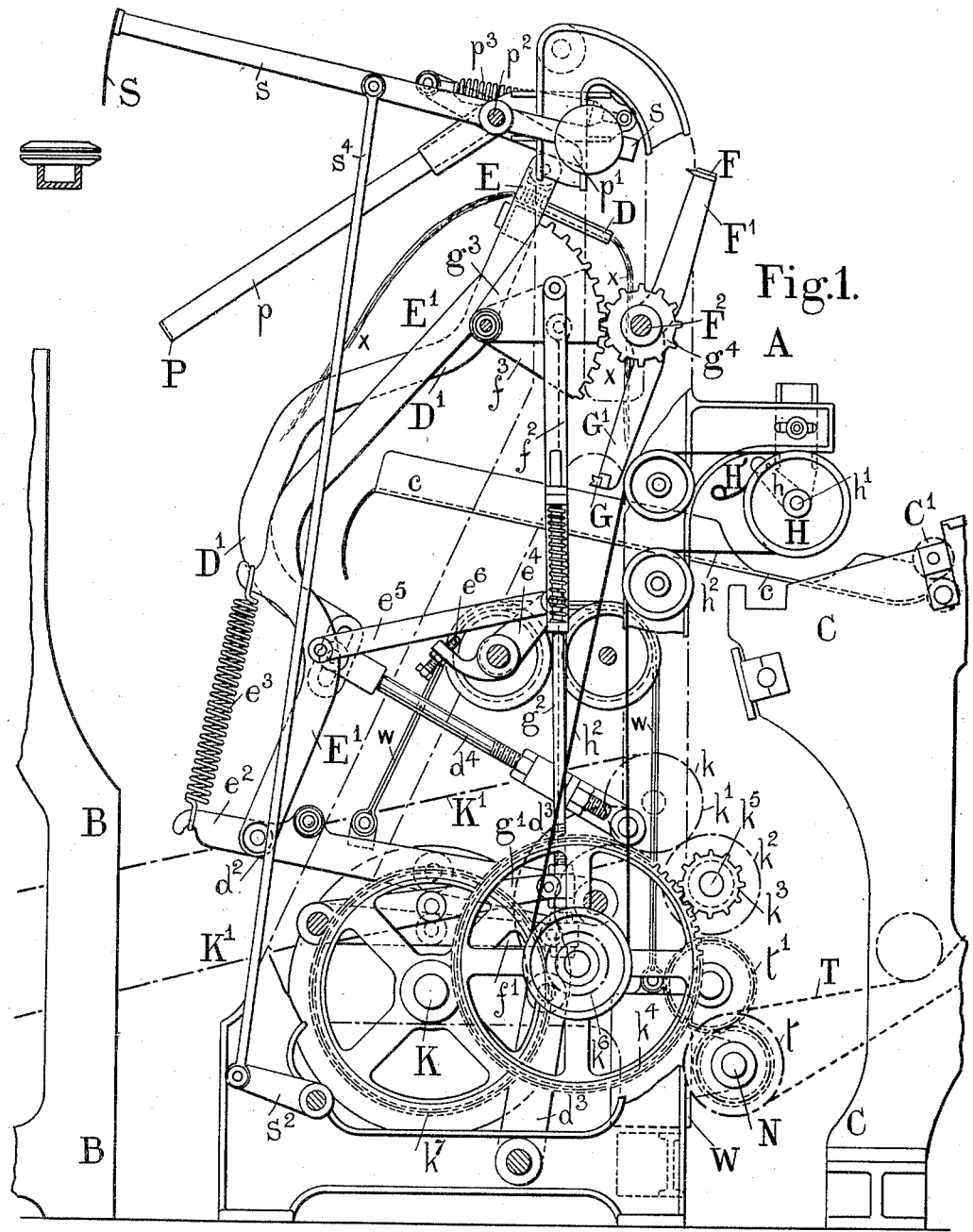
Figure 2:
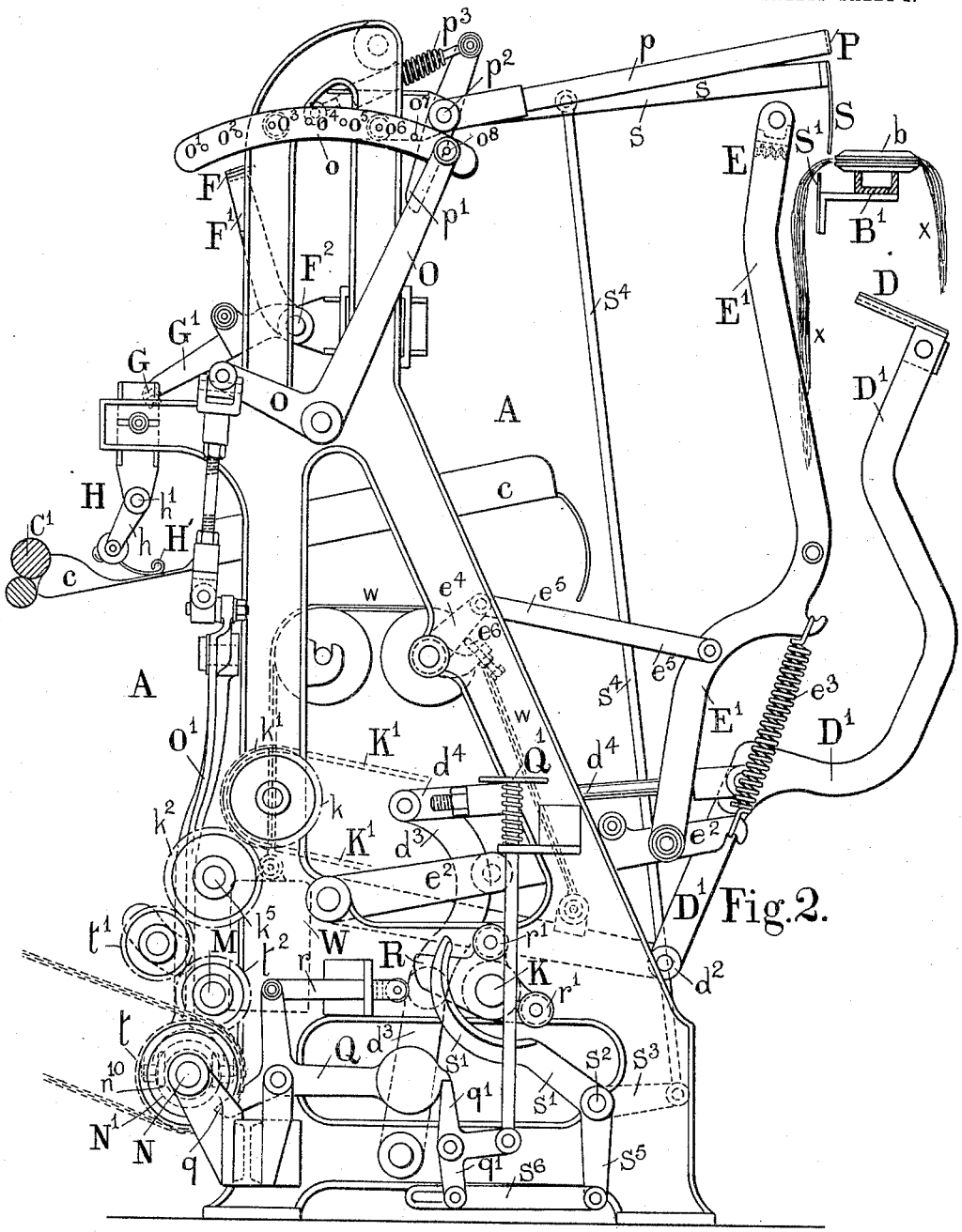
Figure 3:
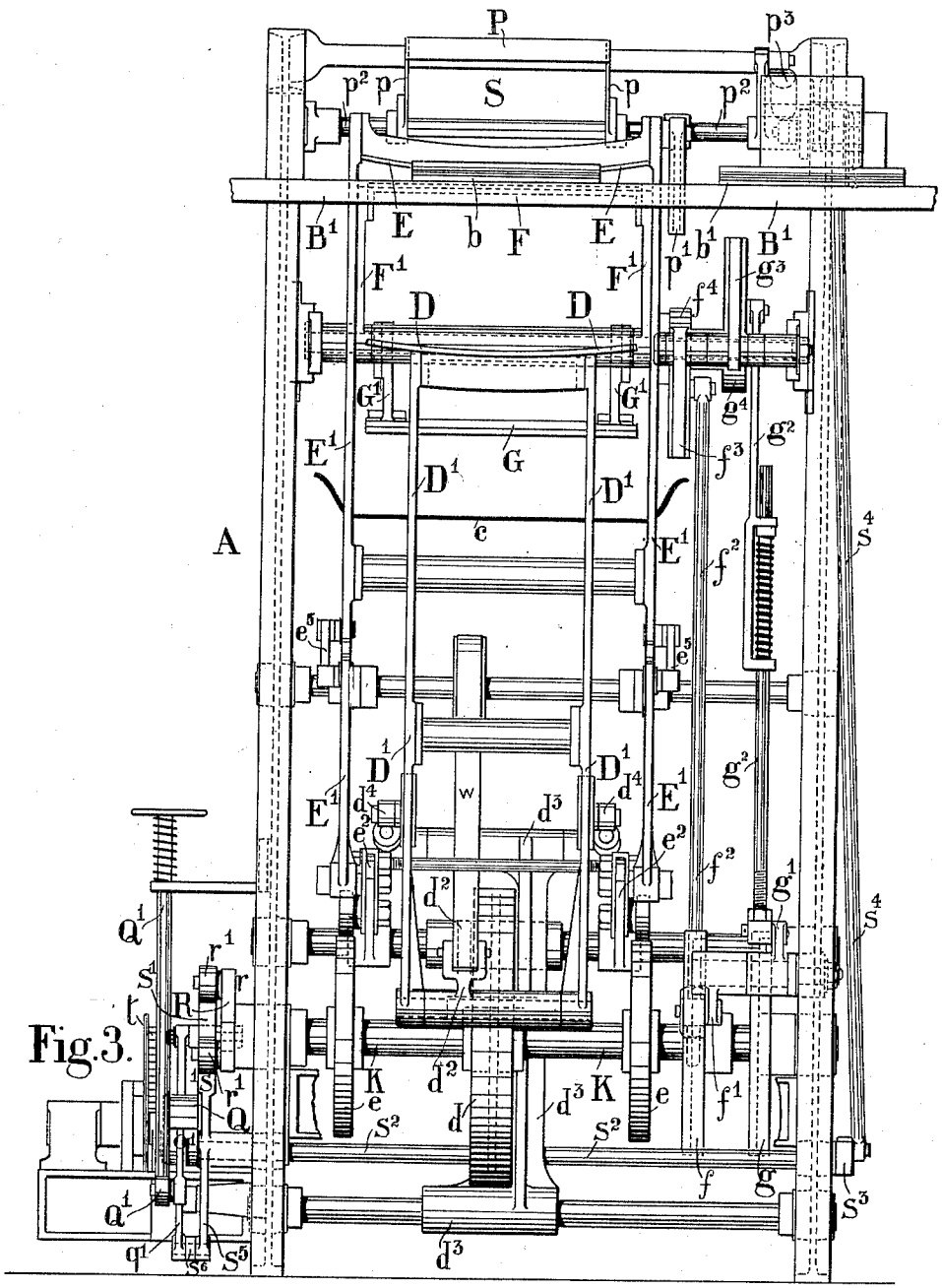
Figure 4:
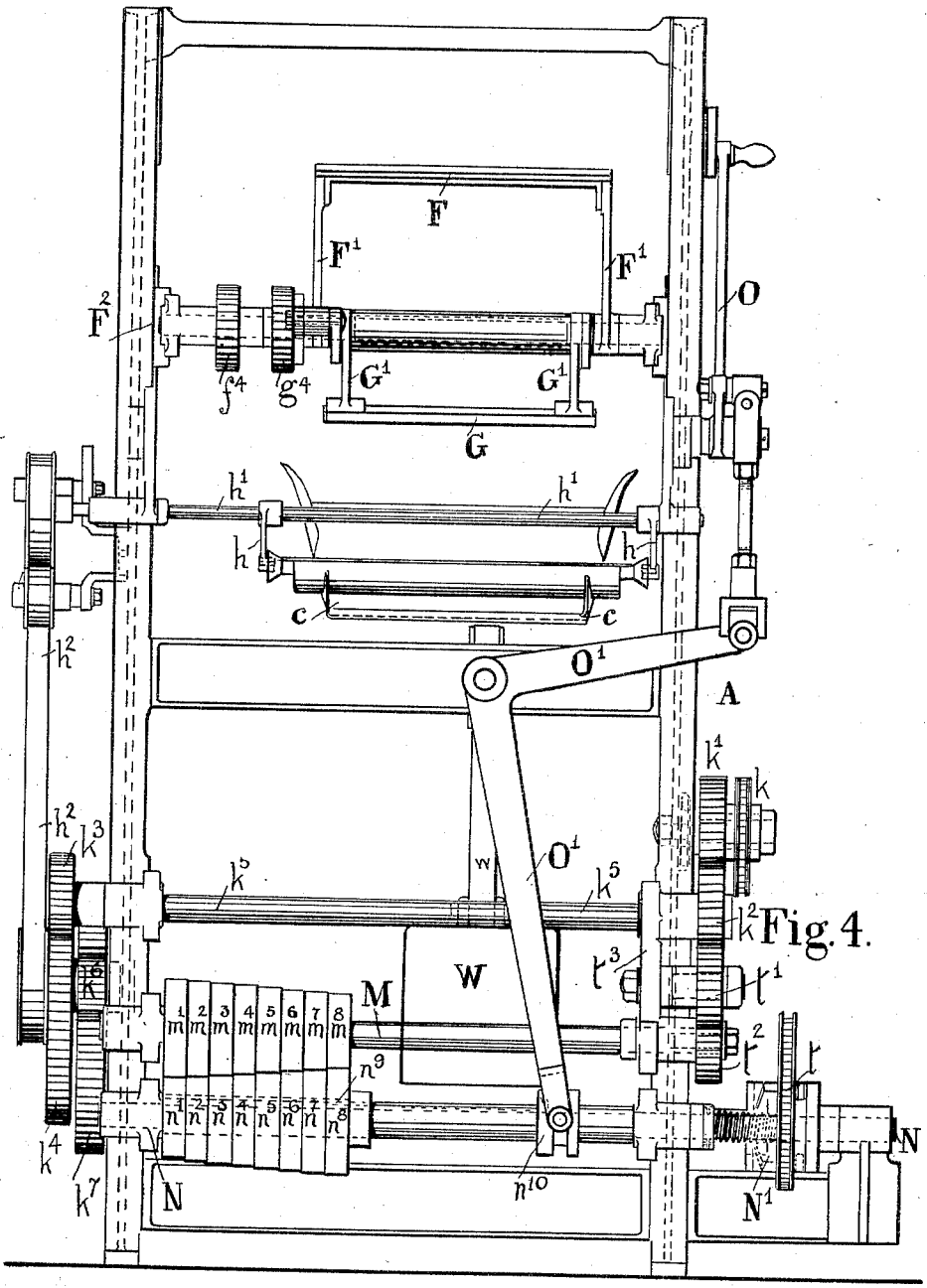
Figure 5:
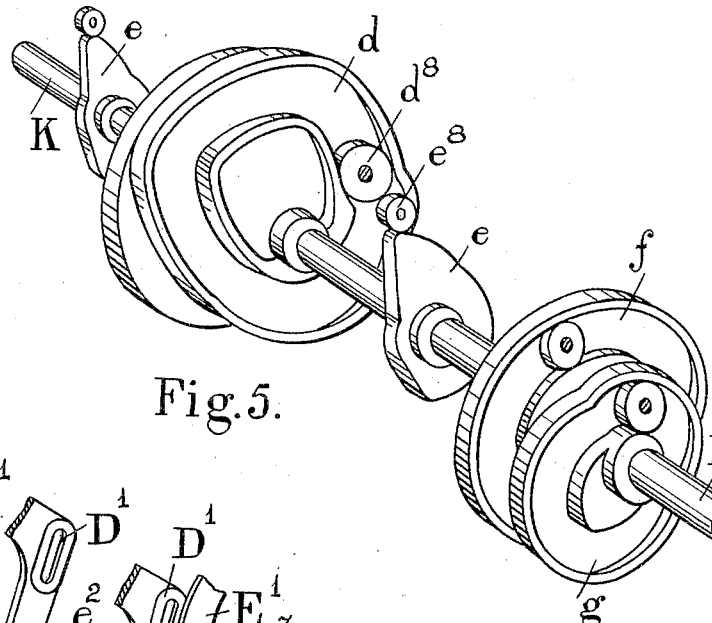
Figure 6:
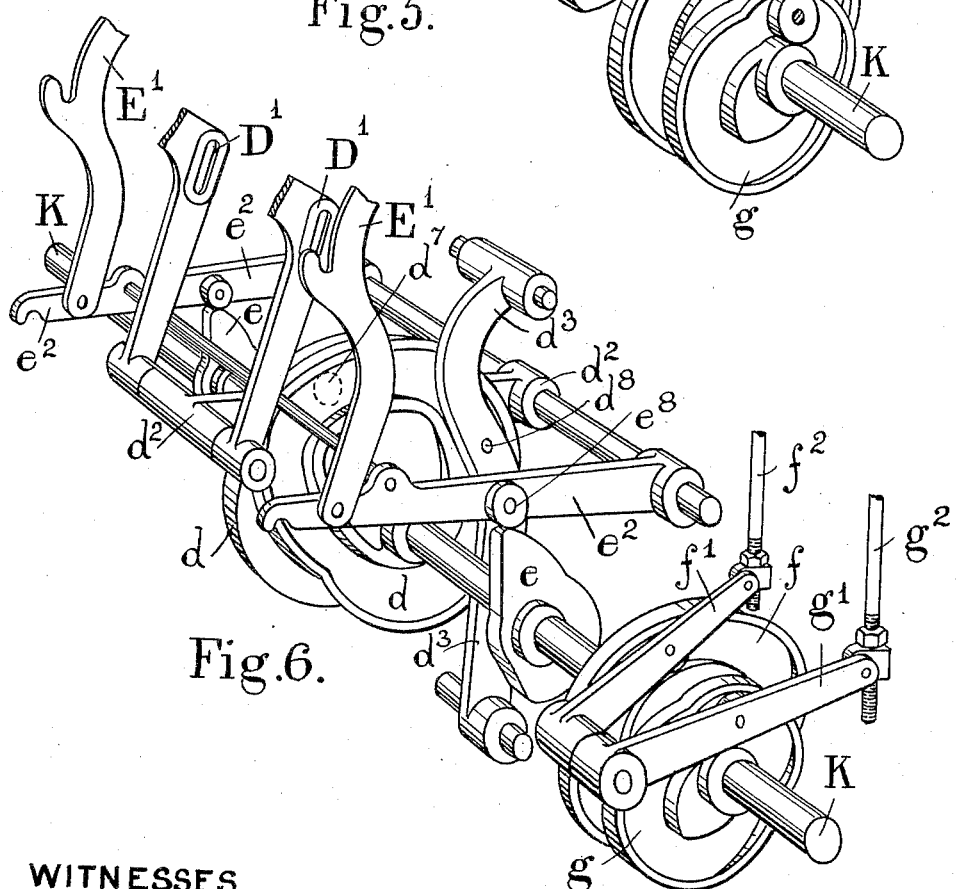

Figure 1 is a side elevation of the apparatus between the hackling machine and the spread board, in position to convey the flax from the former to the latter. Fig. 2 is a similar view taken from the opposite side of the machine and showing the position of the apparatus prior to taking hold of the piece of flax to remove it from the holder. Fig. 3 is an end elevation. Fig. 4 is a similar view taken from the opposite end. Fig. 5 is a perspective view of the cam shaft and the cams mounted thereon. Fig. 6 is a similar view showing the levers which the aforesaid cams actuate.

The hackling machine B is such as described in the before mentioned patents and is provided with a cross channel B' upon which the flax holders $b$ travel. The spread board or gill frame C is also of the ordinary or usual construction and does not require to be described.

Between the hackling machine B and the spread board C is placed the automatic transfer or spreading apparatus A to take hold of the flax $x$ and draw it out of the holder $b$ and lay or spread it upon the table $c$, whence it is carried by the movement of the preceding layer to the back rollers C' of the spread board.

The automatic transfer or spreading apparatus A is constructed with a pair of grippers D and E to remove the flax $x$ from the flax holders $b$, a pair of nippers F and G to transfer the flax $x$ from the grippers and deliver it to the table $c$ of the spread board, and a spreader H to assist in the spreading of the flax on the table $c$.

The grippers D and E are formed of two transverse bars or plates mounted on pairs of levers D' and E' which are operated to approach each other and seize or take hold of the flax $x$ and carry it forward and subsequently to separate and release it, this operation being effected by cams $d$ and $e$ on a cam shaft K, as shown in Figs. 5 and 6.

In Fig. 2 the grippers are shown in position ready to approach and seize the flax and in Fig. 1. they are shown in position transferring the flax to the nippers F and G.

The pair of levers D' of the lower gripper plate D are pivoted at their lower ends upon a lever $d^2$ and are raised and lowered by the double-faced cam $d$ which on one side engages a small roller $d^7$ on said lever $d^2$. The gripper levers D' are rocked or moved to and fro by the engagement of the opposite side of cam $d$ with a roller $d^8$ on the lever $d^3$, which latter is connected to the gripper levers D' by the connecting rod $d^4$.

The gripper D, and the levers D' and $d^2$ are counter balanced by a weight W attached to the weight strap $w$ passing over two pulleys.

Each lever E' of the upper gripping plate E is at its lower end pivoted upon a lever $e^2$ and is raised and lowered by the cam $e$ which engages a small roller $e^8$ on lever $e^2$, and the upper gripping plate E is also raised by the lower gripping plate D when drawn forward beneath it. The upper gripping plate E is rocked or moved to and fro simultaneously with the lower gripping plate D by the latter being brought into contact with it. A pair of springs $e^3$ always tends to move the lever E' toward and hold them in contact with the lever D', this movement of levers E' toward lever D' being arrested by a lever $e^4$ (to which they are connected by a pair of links $e^5$) abutting against an adjustable stop $e^6$.

The nippers F and G which receive the flax from the grippers D and E are formed of two transverse plates or bars mounted on arms or levers F' and G' pivoted upon the transverse shaft $F^2$ so as to rock or swivel independently thereon. The upper nipper plate F is operated by a cam $f$ on the cam shaft K through the lever $f'$, connecting rod $f^2$ and quadrant $f^3$, the said quadrant $f^3$ engaging a pinion $f^4$ on the shaft $F^2$. The lower nipper plate G is operated by the cam $g$ through the lever $g'$, the connecting rod $g^2$ and quadrant $g^3$, the last mentioned element engaging a pinion $g^4$ on the shaft $F^2$. The arms or levers F' of the upper nipper plate are attached to the shaft $F^2$ and the pinion $f^4$ is also keyed to said shaft, and the arms or levers G' are attached to bushes $g^5$ loose on the shaft and one is attached to the pinion $g^4$ by a bolt or other suitable connection.

Over the table $c$ upon which the flax $x$ is deposited the rotary wiper or spreader H is mounted to press down the ends of the flax as it is spread upon the table by the nippers F G. The rotary wiper comprises a curved plate or pan H' carried at the end of levers $h$ on a shaft $h'$ and always driven in one direction by a band $h^2$.

A transverse blade or knife P mounted on levers $p$ is placed to rock in front of the grippers E and F for the purpose of sweeping past the edge of the flax holder $b$ to disengage any loose or tangled fibers that might remain attached thereto. It is held in position and is operated by the upper end of one of the upper gripper levers E' which is provided with a roller for that purpose. The end of this lever E' engages a lever $p'$ affixed to the shaft $p^2$ which carries the rocking blade P the levers $p$ being also secured to the shaft $p^2$. It is lowered to the position shown in Fig. 1. by the levers and is raised to normal position as in Fig. 2. by the spring $p^3$.

The transfer apparatus A is driven from the hackling machine B by a chain K' which drives a chain wheel $k$ from which in turn motion is transferred to the cam shaft K by the train of gears $k'$ $k^2$ $k^3$ $k^4$ $k^6$ $k^7$, the cam shaft K making one revolution for each lift of the hackling machine. The spread board is driven from the transfer apparatus by a chain T from a chain wheel $t$. The gear $k'$ is keyed to the chain wheel $k$ and meshes with the gear $k^2$ keyed to the shaft $k^5$ and to the other end of the shaft $k^5$ is keyed the gear $k^3$ which meshes with the gear $k^4$, the shaft or stud on which gear $k^4$ is mounted carrying, also, the gear $k^6$ which meshes with the gear $k^7$ to drive the cam shaft K.

The chain wheel $t$ is mounted loosely on a shaft N and is operated by a sliding clutch N' keyed to that shaft, said shaft being in turn driven through gearing from the shaft M. The shaft M is driven by a carrier gear $t'$ meshing with the gear $k^2$ on the shaft $k^5$ and with gear $t^2$ on the shaft M. The carrier gear $t'$ is mounted on a stud fixed in a radial slot in a carrier bracket $t^3$. The carrier gear $t'$ is a change gear for which two three or more wheels of different sizes are provided, to be changed as required to drive the spread board C at varying speeds as may be required to lay the pieces of flax $x$ at varying distances apart, upon the table $c$. Thus the successive pieces of flax may be laid to overlie the preceding ones at a distance equal to one third of their length apart; one fourth of their length apart, or one fifth of their length apart to give a three to one overlay, a four to one overlay, or a five to one overlay, or any other overlay, as may be required and is well understood by flax workers. The flax pieces must however be laid down on the table $c$ at distances apart equal to some exact proportion of the length of the pieces.

On the shaft M a number of gears $m'$ to $m^8$ of different sizes are keyed and on the shaft N a corresponding number of gear wheels $n'$ to $n^8$ are mounted loosely, the gears $m'$ to $m^8$ mesh with the gears $n'$ to $n^8$.

The gears $n'$ to $n^8$ are each provided with a slot and any one of them can be engaged and locked or keyed to the shaft N by a sliding spring key $n^9$ attached to a sliding bush $n^{10}$ on the shaft. This change gearing is of well known construction and is operated by the hand lever O through the bell crank lever O' by which the bush $n^{10}$ is moved to and fro in either direction on the shaft N. The hand lever O moves to and fro over a quadrant $o$ and is provided with a spring catch which engages holes or notches $o'$ to $o^8$ therein so that it can be set in any position to lock any desired one of the gears $n'$ to $n^8$ to the shaft N. By this arrangement the shaft N is driven at various speeds for different lengths of flax. In operation at the commencement of the new parcel of flax the attendant measures some of the pieces, and moves the handle O to the notch corresponding to the length of the flax.

The clutch N' by which the chain wheel $t$ is driven is held in gear with the wheel $t$ by a spring. The clutch N' is provided with a wedge shaped rim with which the end of the lower member $q$ of a weighted lever Q is caused to engage when it is desired to throw the clutch out of gear and stop the spread board C. The weighted lever Q is held normally out of contact with clutch N' by the rocking lever $q'$ to which a foot lever Q' is connected. By depressing the foot lever Q' the rocking lever $q'$ is withdrawn and the weighted lever released, thereby bringing the end of member $q$ into the path of the wedge shaped face of clutch N' and throwing the clutch out of gear with the wheel $t$. The clutch N' is automatically caused to reengage with the wheel $t$ by a rotating cam R which engages a link $r$ connected to the weighted lever Q and brings the latter back to its normal position and the member $q$ out of contact with the clutch.

*Automatic stop motion.*—The chain wheel $t$ for driving the spread board may also be automatically stopped to stop the spread board C when any one of the flax holders $b$ is presented to the grippers D and E without flax, and thus prevent the flax on the spreading table $c$ being moved forward without a piece of flax being deposited thereon. A stop plate or feeler plate S carried by levers $s$ is mounted in front of the cross channel B' of the hackling machine and to the channel a corresponding plate S' is affixed by a suitable bracket. The feeler plate S is placed to one side of the grippers D and E opposite the flax holder $b'$ next in succession to be moved into position in front of the grippers. An oscillating movement is given to it for each lift of the machine by the rollers $r'$ on the cam R engaging the lever $s$. The lever $s'$ is on one end of the shaft $s^2$ and is connected to the stop levers $s$ by the lever $s^3$ on the other end of the shaft and the connecting rod $s^4$. When there is flax in the holder the downward movement of the feeler plate S is arrested in the position shown in Fig. 2. by resting upon the flax $x$. Should the holder be empty and the flax absent the plate descends to a lower position and allows the lever $s'$ to follow the rollers $r'$. The lower member $s^5$ of the lever $s'$ is connected by a link $s^6$ with the rocking lever $q'$ which retains the weighted lever Q out of engagement with the driving clutch N'; consequently when the lever $s'$ is moved beyond its normal position the lever $q'$ is caused to move, the lever Q is released and its lower member $q$ brought into contact with the clutch N' to throw it out of gear with the chain driving wheel $t$, and as previously thereby stops the spread board C for one lift of the hackling machine B. The clutch N is caused to reëngage with the chain wheel $t$ at the next lift to re-start the spread board C by the cam R engaging the link $r$ and withdrawing the weighted lever Q out of the path of the clutch N' as previously described.

The operation of the spreader or transfer apparatus A is as follows. The flax holders $b$ are moved into position on the cross channel B and unscrewed in the usual manner, the lower gripper plate D and the upper gripper plate E being in the position shown in Fig. 2. The lower gripper plate is raised by the cam $d$ acting upon the lever $d^2$ and simultaneously moved forward by the cam $d$ acting upon the lever $d^3$ until the latter is beneath the upper gripper plate E raising it and gripping the flax $x$ between them. The continued forward movement of the levers $d^3$ and D' carry the grippers and flax forward into the position shown in Fig. 1. when the cam $d$ causes the lower gripper plate D to descend and the grippers D and E to separate. The nippers F and G are now caused by their cams $f$ and $g$ to approach and close upon the flax $x$ and retain it as the transfer grippers D and E recede. The free end of the flax $x$ falls upon the table $c$ of the spread board and the nippers open; the lower nipper by moving downward in the arc of a circle, slowly spreads the piece of flax $x$ evenly upon the table $c$ as it moves forward on said table to the feed rollers, the wiper or spreader H pressing down the ends of the fibers where they over lap one another. Thus the action of the spreader A is continuous and automatic to transfer each piece of flax $x$ successively from the holder $b$ of the hackling machine B and spread it upon the table $c$ of the spread board or gill frame C.

What we claim as our invention and desire to protect by Letters Patent is:—

1. The combination, with a hackling machine and a spread board, of flax transfer and spreader apparatus comprising in its construction a pair of grippers to seize and transfer the flax from the hackling machine, a pair of nippers to receive the flax from the grippers and transfer it to the spread board, and means for successively operating said grippers and nippers.

2. The combination, with a hackling machine and a spread board, of flax transfer and spreader apparatus comprising in its construction means for seizing and carrying forward the flax from the hackling machine, means for receiving the flax from the first-named means and laying it down upon the spread board, and mechanism for operating the first and second-named means.

3. The combination with a hackling machine and a spread board, of a flax transfer and spreader apparatus comprising in its construction a pair of grippers to seize and transfer the flax from the hackling machine, means for operating said grippers, a pair of nippers to receive the flax from said grippers and lay it down upon the spread board, and means for operating said nippers.

4. In flax transfer and spreader apparatus, the combination, with a pair of gripping members, and a pair of gripper levers whereon each gripping member is mounted, of supporting levers connected to said gripper levers for raising and lowering the same, an actuating lever connected with one pair of gripper levers for rocking the same to and fro, cams for operating said supporting levers and said actuating lever, and mechanism for operating said cams.

5. In flax transfer and spreader apparatus, the combination, with a pair of gripping members and operating mechanism therefor, of a pair of nipping members to receive the flax from the gripping members, nipper levers connected with the nipping members, a shaft whereon said levers are mounted, and mechanism connected with said shaft for rocking said levers.

6. In flax transfer and spreader apparatus, the combination, with a pair of gripping members and operating mechanism therefor, of a pair of nipping members, nipper levers connected with the nipping members, a shaft whereon said nipper levers are mounted, and mechanism for rocking said levers embodying a pair of cams and operating means therefor, a lever operated by each cam, a rod connected to each second-named lever, a quadrant connected to each rod, and a pair of pinions mounted upon said shaft and connected with said nipper levers, said pinions being engaged with said quadrants.

7. In flax transfer and spreader apparatus, the combination, with grippers and means for operating the same, and spreading nippers and means for operating the same, of a rotary spreader to press down the ends of the flax, and means for rotating the spreader substantially as described.

8. In flax transfer and spreader apparatus, the combination, with grippers and means for operating the same, and spreading nippers and means for operating the same, of a reciprocating blade, levers upon which said blade is mounted, and means for operating said levers to rock said blade in front of the grippers to disengage any loose or entangled fibers substantially as described.

9. In flax transfer and spreader apparatus, the combination, with gripping and nipping means, and operating means therefor, of a reciprocating blade, levers whereon said blade is mounted, a lever operatively associated with the first-named levers for rocking the same and said blades, means carried by the gripper-operating means for rocking the last-named lever in one direction, and means for rocking said last-named lever in the other direction.

10. In flax transfer and spreader apparatus, the combination, with gripping and nipping means, and operating means therefor, of a reciprocating blade, a pair of levers by which said blade is carried, a shaft whereon said levers are mounted, a lever secured to said shaft for rocking the same in opposite directions, a roller carried by the gripper-operating means for engagement with the last-named lever to rock said shaft in one direction, and a controlling spring connected with said last-named lever to rock said shaft in the other direction.

11. In a flax transfer and spreader apparatus, the combination, with grippers and means for operating the same, and spreading nippers and means for operating the same, of a feeler plate, and means for rocking said plate to cause it to rest upon the flax.

12. In flax transfer and spreading apparatus, the combination, with gripping and nipping means, and operating means therefor, of a feeler plate, a pair of levers upon which said plate is mounted, a rod connected to one of said levers, a rocking lever with which said rod is connected, a cam for operating the rocking lever, and mechanism for operating said cam.

13. In flax transfer and spreading apparatus, the combination, with gripping and nipping means, and operating means therefor, of a feeler plate, a pair of levers upon which said plate is mounted, a rod connected to one of said levers, a rocking lever with which said rod is connected, a cam for operating the rocking lever, mechanism for operating said cam, a link connected to said rocking lever, a triplever connected to said link, and means controlled by said trip lever for stopping the apparatus.

14. In flax transfer and spreading apparatus, the combination, with gripping and nipping means, and operating means therefor, of a feeler plate, a pair of levers upon which said plate is mounted, a rod connected to one of said levers, a rocking lever with which said rod is connected, a cam for operating the rocking lever, mechanism for operating said cam, a link connected to said rocking lever, a trip lever connected to said link, a drive shaft provided with a clutch, a clutch lever controlled by said trip lever, and means for restoring said trip lever to normal position after having been tripped.

15. In flax transfer and spreader apparatus, the combination, with grippers and means for operating the same, and spreading nippers and means for operating the same, of a stop lever, a trip lever connected thereto, a clutch lever held by the trip lever, and a clutch substantially as described.

16. In flax transfer and spreader apparatus, the combination, with grippers and means for operating same, and spreading nippers and means for operating same, of a stop lever, a trip lever connected thereto, a clutch lever held by the trip lever, a clutch, and means to return the clutch and lever to normal position.

17. In flax transfer and spreader apparatus, the combination, with grippers and means for operating the same, and spreading nippers and means for operating the same, of a stop lever, a trip lever connected thereto, a clutch lever held by the trip lever, a clutch, a link connected to the clutch lever, a cam, and means for operating said cam.

18. In flax transfer and spreader apparatus, the combination, with grippers and means for operating the same, and spreading nippers and means for operating the same, of a driving chain, a cam shaft, a train of gears to rotate said cam shaft, a driving shaft, and a train of gears to rotate said driving shaft.

19. In flax transfer and spreader apparatus, the combination, with grippers and means for operating the same, and spreading nippers and means for operating the same, of a driving chain and chain wheel, a driving shaft, gearing connecting said chain wheel and said driving shaft, a clutch shaft, adjustable differential gearing between said driving shaft and said clutch shaft, a clutch carried by said clutch shaft, means for operating said clutch, spreading mechanism, and connections between said spreading mechanism and said clutch shaft for driving the former from the latter.

In testimony whereof we have hereunto set our hands in presence of two subscribing witnesses, this 25 day of May 1911.

JOSHUA VALENTINE EVES.
PETER SHAW.

Witnesses:
EDWARD BENNETT,
FREDK. W. DOWNEY.

Copies of this patent may be obtained for five cents each, by addressing the "Commissioner of Patents, Washington, D. C."